June 25, 1968

E. H. ENGELHARDT 3,390,203

POLYSILICIC ACID/HYDROXYALKYL VINYL ETHER-TETRAFLUOROETHYLENE
OF CHLOROTRIFLUOROETHYLENE COPOLYMERS CONTAINING
SELECTED SODIUM AND POTASSIUM SALTS
Filed Sept. 29, 1966

INVENTOR
EUGENE HERMAN ENGELHARDT

BY James H. Ryan

ATTORNEY

United States Patent Office 3,390,203
Patented June 25, 1968

3,390,203
POLYSILICIC ACID/HYDROXYALKYL VINYL ETHER-TETRAFLUOROETHYLENE OF CHLOROTRIFLUOROETHYLENE COPOLYMERS CONTAINING SELECTED SODIUM AND POTASSIUM SALTS
Eugene Herman Engelhardt, Wilmington, Del., assignor to E. I. du Pont de Nemours and Company, Wilmington, Del., a corporation of Delaware
Filed Sept. 29, 1966, Ser. No. 583,002
7 Claims. (Cl. 260—827)

ABSTRACT OF THE DISCLOSURE

Coating compositions formed from polysilicic acid and a copolymer of chlorotrifluoroethylene or tetrafluoroethylene and an omega-hydroxyalkyl vinyl ether having improved resistance to aqueous alkali due to incorporation of at least one member of the group consisting of sodium thiocyanate, potassium thiocyanate, and sodium or potassium salts of carboxylic acids.

---

This invention relates to, and has as its principal object provision of, improvements in coatings, particularly for plastics, to increase the resistance of the same to attack by aqueous alkali.

In the copending coassigned application of Bechtold and Fawcett Ser. No. 464,063, filed June 15, 1965, the entire specification of which is incorporated herein by reference, there are disclosed improved coating materials particularly useful for glass substitutes such as plastics. The plastics themselves, e.g., poly(methyl methacrylate), have excellent resistance to shattering and are easily formed or fabricated and sealed to supports. They are, however, subject to surface scratchings since most of them are relatively soft. The Bechtold and Fawcett application provides coating materials with superior surface hardness and adhesion by the use of solutions of polysilicic acid with polymers containing fluorine and primary alcoholic hydroxyl groups, but some of these coatings fail under certain conditions. Failure occurs particularly when the coating is contacted for extended periods of time with an aqueous alkaline material, e.g., a strong aqueous alkaline soap or a detergent solution containing ammonia or alkali.

Figure 1:
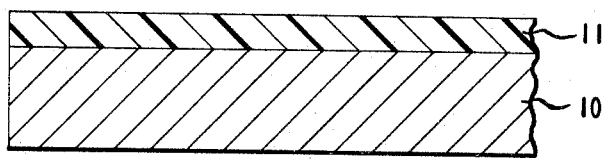
Figure 2:
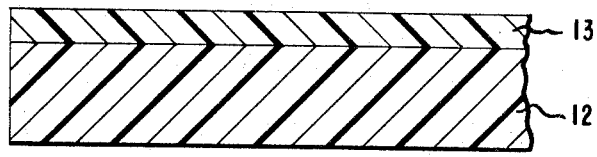

It has now been found that aqueous alkali-resistant coatings containing a complex of polysilicic acid and a copolymer of chlorotrifluoroethylene or tetrafluoroethylene with a hydroxyalkyl vinyl ether are obtained when the composition contains 0.025 to 2%, based on weight of the polymeric ingredients, of dissolved sodium or potassium thiocyanate, carboxylates or salts which in the presence of a lower alkyl carboxylic acid give the carboxylate. Further details of the invention will be evident from the remainder of the specification and from the drawings (not in scale) in which:

FIG. 1 shows the coating of the invention, made from the coating-forming composition thereof, applied to any solid substrate. In FIG. 1, the numeral 10 refers to the substrate, which as shown may be a metal, e.g., aluminum, and numeral 11 refers to a coating of any of the compositions of the invention laid down upon the substrate; and FIG. 2 shows a preferred embodiment of the invention in which the numeral 12 refers to a transparent plastic, e.g., poly(methyl methacrylate), employed as a solid substrate carrying a preferred transparent polymeric or complex coating of the invention designated by numeral 13, e.g., one based on a stable complex of silica and a tetrafluoroethylene/4-hydroxybutyl vinyl ether copolymer.

The coating composition employed in preparing the coatings of the invention generally has 10–90 parts of polysilicic acid (calculated as $SiO_2$) and, in an amount sufficient to make 100 parts on a weight basis, an organic copolymer of chlorotrifluoroethylene or tetrafluoroethylene with a copolymerizable monomer having primary alcoholic hydroxyl as illustrated by an $\omega$-hydroxyalkyl vinyl ether. These, with optional adjuvants in minor amounts such as organosilicones or Cellosolve®, are made up into homogeneous solution which generally contains as solvents a lower alkanol and a lower alkanoic acid.

When the coating solution contains a lower alkanoic acid, any sodium or potassium added to the solution as a strongly basic compound or salt of a weak acid can be considered as present as the carboxylate. Thus, sodium or potassium borohydride, hydroxide, borate, and carbonate added to an acetic acid solution is present as an equivalent (on a molar basis) amount of sodium or potassium acetate. In the coating solution, the salt is in solution in ionic form, and it is the presence of small amounts of the sodium or potassium ion that appears important.

The mechanism by which the addition of small amounts of sodium or potassium salts improves coating properties is not evident. Other alkali metal salts, those of lithium and cesium, have not produced results that are as useful.

The polysilicic acid employed with the hydroxyl-bearing organic copolymers is readily available. For example, ethyl silicate (tetraethyl orthosilicate) is a commercial product. It is soluble in organic solvents and readily hydrolyzed by water to a useful soluble polysilicic acid. By use of varying amounts of water, the exact degree of hydrolysis can be varied. A compatible solvent system is a lower alcohol, particularly ethanol. A general formula for the preparation of the polysilicic acid solutions (15% $SiO_2$) is 100 parts by weight of ethyl silicate plus (92–X) parts of ethanol or similar diluent, X being the amount of water or, preferably, of 0.1 N hydrochloric acid employed. In general, X is preferably about 22.5 or greater. When X is 18 or less, the hydrolysis of ethyl silicate is insufficient, to give a good polysilicic acid for use in this invention, unless further hydrolysis is brought about in the coating solution or process. Although more water can be used, i.e., X is up to 50 or more, such large amounts are generally not necessary and may affect adversely the compatibility with some of the organic polymers to be used.

The synthetic hydroxyl-containing polymeric materials employed with the polysilicic acid are solid materials with an inherent viscosity of 0.1 or higher. Copolymers of the perhalogenated fluorine-containing monomers chlorotrifluoroethylene or tetrafluoroethylene with hydroxyl-containing vinyl ethers are obtained by conventional polymerization techniques. The vinyl ethers generally result from reaction of acetylene with polyhydric alcohols to provide as illustrative monomers the following: 2-hydroxyethyl vinyl ether, 4-hydroxybutyl vinyl ether, 3-hydroxypropyl vinyl ether, and 6-hydroxyhexyl vinyl ether. Preferably the vinyl ethers have the formula $CH_2=CHO(CH_2)_nOH$ where $n$ is 2–8. A process for the preparation of such copolymers has been described in U.S. Patent 3,159,610. As noted, the preparation of complexes of these copolymers with silica and the use of the complexes as coating materials is described in the above-mentioned Bechtold and Fawcett application.

Solvents useful for the preparation of coating compositions depend on the polymeric materials employed, on the substrate, and on other factors such as evaporation rate, etc. It is usually desired that the solvent have appreciable vapor pressure below 100° C. and preferably boil below about 100–125° C. The solvent system should be compatible with the ingredients in a wide range of proportions. Useful solvents include particularly lower alkanols (e.g., methanol, ethanol, propanols, butanols) and mixtures of alkanols with lower (1–3 carbon) alkanoic acids. Halogenated solvents, e.g., trichloroethylene, can be present. Adjuvants, such as small amounts of Cellosolve® derivatives, are useful as anti-haze agents.

The addition of small amounts of (0.05–5%, based on weight of polysilicic acid/polymeric alcohol) of a block copolymer of mixed lower alkylene (2–4 carbon) oxides with dimethyl siloxane promotes even spreading and drying of the coating solution to form thick even coatings. Particularly preferred block copolymer adjuvants are those having units from both polyethylene oxide and polypropylene oxide and a dimethyl silane content of 20–25% as described in French Patent 1,330,956 or U.S. Patent 3,172,899. The use of the organosilicones in silica/polymeric alcohol coating solutions is described in my copending application Serial No. 464,184, filed June 15, 1965.

The coating solution, which usually has a viscosity of 10–300 cps., can generally be used in coating for several weeks after preparation, particularly if care has been taken to employ relatively pure ingredients and compatible solvents and additives. The solutions can be applied to the surfaces to be protected (e.g., painted surfaces, glass, wood, etc.) by known methods such as flowing, spraying, doctoring, gravure roll, dipping, etc. For spray applications or rapid withdrawal rates from baths, the viscosity is generally lower than for flowing or dipping using slow withdrawal rates. The solids content and viscosity are generally in direct proportion to the thickness desired in the final film. For example, with a solution of solids content of 10%, an initial thickness of solution layer should be about $75\mu$ to give a final solvent-free coating of about $5\mu$. Solvents generally include both the lower alkanols and alkanoic acids such as 1–5 carbon alkanols and 1–3 carbon alkanoic acids. These are particularly preferred since they are compatible with the silicic acid which generally is in aqueous alcohol solution. The solvent is removed preferably by evaporation generally at elevated temperatures to ensure its rapid and complete removal. After removal of the solvent, the coating is either heated for some time (e.g., at 60° C. for 15 hours or at 170° C. for ¾ hour) or held for several days at room temperature to allow the coating to cure to the hard, abrasion-resistant layer desired. In general, the higher the silica content of the layer, the lower the temperature required for curing.

As in the above-mentioned Bechtold and Fawcett application Serial No. 464,063, the silica-containing product of this invention has

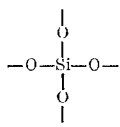

units with at least one oxygen attached to another silicon and with 0 to 2 (average less than 1) other oxygens attached to the carbon of a hydroxy aliphatic fluorine-containing polymer via condensation, and oxygens not satisfied by such bonds, being attached to hydrogen. The sodium or potassium ions are regarded as trapped within the gross silicate structure or perhaps as replacing some hydrogen on oxygen. The ultimate hard structure is thus thought to consist of two coextensive compatible transparent structures, one of a tough linear polymer chemically bonded at several points to a hard, three-dimensional

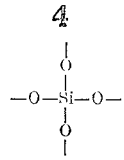

network. In other words, the structure can be pictured as a macromolecular (nonparticulate) reinforcement of the essentially linear organic polymer or as a plasticization of a hard polyfunctional condensation polymer (polysilicic acid) with a tough linear organic polymer. It may thus be regarded as an interlocking copolymer or complex of silica and the preformed copolymer containing entrapped (or replacement) sodium and/or potassium.

Regardless of the theoretical structure of the ultimate hard coating complex of this invention, it provides insoluble, inert, abrasion-resistant finishes that are also resistant to aqueous alkaline conditions. Polymeric materials coated with the new composition are useful in the fabrication of flat or curved plastic enclosures, such as windows, windshields, lenses, etc.

The following examples illustrate specific embodiments of this invention. In these examples, parts, percentages and ratios are by weight unless otherwise specified.

EXAMPLE 1

A coating solution was prepared as follows:
30 g. of hydrolyzed ethyl silicate (15% $SiO_2$) in ethanol.
79.5 g. of 13.2% 4-hydroxybutyl vinyl ether/tetrafluoroethylene copolymer (mol ratio of 1/1).
36 g. of n-butyl alcohol.
32.5 g. of acetic acid.
0.35 g. of potassium bicarbonate in 10 g. of acetic acid.
One drop of alkylene oxide/methyl siloxane block copolymer.

Panels of clear poly(methyl methacrylate) sheeting were immersed in the above coating bath for about two minutes followed by a withdrawal rate of 8–10 in./min. The coated panels were air-dried and placed in an air circulating oven for ½ hour at 170° C. to give optically clear coatings of $3-6\mu$ thickness.

Portions of the coating were rubbed with a bar of an alkaline soap and placed in an atmosphere having 100% humidity for 16 hours. At the end of this time, optical appearance and resistance to scratching by steel wool were superior to those of a panel prepared in the same way except that no potassium carbonate was used.

EXAMPLE 2

A coating solution of the same composition as Example 1 was prepared except that in place of the potassium bicarbonate 0.2 g. of potassium thiocyanate (dissolved in 10 g. acetic acid) was added thereto. Coatings were prepared as described in Example 1 and alkali soap resistance measured. No optical damage and no loss of scratch resistance were observed on a 16-hour exposure to 100% relative humidity.

EXAMPLE 3

A coating solution was prepared as in Example 1 except that varying amounts of potassium thiocyanate were used as the potassium salt. Panels were coated and a set subjected to treatment with alkaline soap as indicated in Example 1 and a second set treated with a cleanser solution containing ammonia and a detergent. The following table shows the results obtained:

| Sample | Wt. of KSCN in 100 g. of Coating Solution | Alkaline Soap | | Ammonia/Detergent | |
| --- | --- | --- | --- | --- | --- |
| | | Optical Damage | Scratch Resistance | Optical Damage | Scratch Resistance |
| A | None | Yes | Very poor | Yes | Very poor. |
| B | 0.001 | Yes | Improved | Yes | Do. |
| C | 0.005 | Yes | do | Yes | Do. |
| D | 0.025 | None | Better than (C) | Slight | Improved. |
| E | 0.05 | do | Better than (D) | None | Excellent. |
| F | 0.20 | do | do | do | Do. |

EXAMPLE 4

A solution containing the following was prepared:

45 g. of hydrolyzed ethyl silicate (15% $SiO_2$: $x=45$) in ethanol (pH, 3)
126 g. of about 13% 4-hydroxybutyl vinyl ether/tetrafluoroethylene copolymer in t-butyl alcohol (pH, 4)
9 g. of n-butyl alcohol
45 g. of acetic acid
5 drops of alkylene oxide/siloxane copolymer (see Example 1)

The above solution and solutions containing potassium or sodium hydroxide were used to coat poly(methyl methacrylate) panels in the manner described in Example 1. Table I shows results obtained when increments of 0.03 g. of KOH in 5 g. of 80 t-butyl alcohol/20 acetic acid were used:

Table I

| Amount of KOH (g.): | Alkaline soap resistance |
|---|---|
| None | Poor |
| 0.03 | Poor |
| 0.06 | Fair |
| 0.09 | Excellent |
| 0.12 | Good |

Table II shows results obtained when increments of 0.02 g. of NaOH in 5 g. of t-butyl alcohol/acetic acid 80/20 were used:

Table II

| Amount of NaOH (g.) | Alkaline soap resistance |
|---|---|
| 0.02 | Poor |
| 0.04 | Excellent |
| 0.06 | Good–excellent |
| 0.08 | Good–excellent |

EXAMPLE 5

To about 150 g. of coating solution prepared as described in Example 4 was added, in two increments of 0.1 g. each, potassium borohydride. Coatings from both solutions withstood attack by the alkaline soap test as described in Example 1.

When sodium borohydride (0.2 g.) was added in place of the potassium borohydride, coatings resisted attack by aqueous alkaline soap.

When another alkali metal compound was used, for example, the same amount of lithium borohydride, the coating was attacked by the soap.

EXAMPLE 6

To 40 g. of a coating solution such as described in Example 1 was added 0.05 g. of sodium thiocyanate instead of the potassium bicarbonate. Panels of poly(methyl methacrylate) coated with this solution after drying and baking had excellent scratch resistance and no loss of optical properties after the treatment with alkaline soap as described in Example 1.

EXAMPLE 7

A coating solution was prepared from:

30 g. of hydrolyzed ethyl silicate (15% $SiO_2$)
84 g. of 13.2% of 4-hydroxybutyl vinyl ether/tetrafluoroethylene copolymer in t-butyl alcohol
36 g. of n-butyl alcohol
0.1 g. of potassium thiocyanate
One drop of silicone copolymer (see Example 1)

Panels coated with this solution after drying and heating as described in Example 1 had excellent scratch resistance and resistance to aqueous alkali.

In the preceding examples, in place of tetrafluoroethylene in the copolymer, chlorotrifluoroethylene or a mixture of chlorotrifluoroethylene with tetrafluoroethylene can be present. Similarly, other hydroxyalkyl vinyl ethers can be used for the preparation of the copolymer. Thus copolymers of chlorotrifluoroethylene and/or tetrafluoroethylene with 2-hydroxyethyl vinyl ether, 3-hydroxypropyl vinyl ether, 6-hydroxyhexyl vinyl ether, etc., are particularly useful as the organic polymer portion of scratch-resistant coatings.

In the examples, the coating solution before addition of the selected sodium or potassium salts may contain up to about 25 parts per million (0.0025%) of alkali metal resulting from the processes used for preparation of the polymer solutions. This amount is insufficient to give protection against alkaline solution attack of coatings.

As shown in the preceding description, the addition of sodium or potassium as a basic salt aids in the production of scratch-resistant coatings that are resistant to aqueous alkaline attack. The amount required to give optimum properties is subject to variation with greater amounts needed when the residual acidity of the coating solution is high, i.e., acidity remaining in polysilicic acid solution when a mineral acid is used for the conversion of alkyl silicate to silicic acid. For the purpose of this invention, the amount of the sodium or potassium salt should vary from 0.025% to 2% of the weight of polymer solids (i.e., polysilicic acid as $SiO_2$ and the polyhydroxylated polymer). Although the amount of sodium or potassium salt is within this range, salts which have a lower metal content are generally used in larger amounts than salts or compounds having a high equivalent weight of the alkali metal.

The preceding examples illustrate the use of sodium and potassium thiocyanates and other salts in coating compositions. One preferred class of useful salts is sodium and potassium carboxylates, i.e., sodium or potassium salt of an aliphatic or aromatic carboxylic acid having up to about 16 carbons and up to two carboxyl groups, preferably hydrocarbon except for carboxy, including formate, propionate, butyrate, benzoate, cinnamate, phthalate, laurate, palmitate and stearate. Preferably the carboxylate is lower, e.g., up to 4 carbons, and free from unsaturation. Of the carboxylates, the ones preferred are those of acids which have substantial volatility at the curing temperature (e.g., 90–170° C.) of the final coating. Although particularly preferred of the salts is potassium thiocyanate for the improved properties of coatings derived from compositions containing it, other useful salts include sodium and potassium sulfide and borate.

Since obvious modifications and equivalents in the invention will be evident to those skilled in the chemical arts, I propose to be bound solely by the appended claims.

The embodiments of the invention in which an exclusive property or privilege is claimed are defined as follows:

1. In a coating composition formed from polysilicic acid and a copolymer of chlorotrifluoroethylene or tetrafluoroethylene and an ω-hydroxyalkyl vinyl ether, the improvement increasing resistance to aqueous alkali comprising the incorporation within said composition of 0.025 to 2% by weight, based on the combined weight of polysilicic acid calculated as silica and copolymer, of at least one member of the group consisting of sodium thiocyanate, potassium thiocyanate, and sodium or potassium salts of aromatic or aliphatic carboxylic acids, said acids having no more than two carboxyl groups and up to 16 carbon atoms.

2. The coating composition of claim 1 in liquid solution.

3. The coating composition of claim 1 in liquid solution containing potassium thiocyanate.

4. The coating composition of claim 1 wherein the copolymer is a copolymer of tetrafluoroethylene and 4-hydroxybutyl vinyl ether.

5. An article comprising the coating composition of claim 1 in the form of a solid complex laid down upon a solid substrate.

6. The article of claim 5 wherein the solid substrate is formed from poly(methyl methacrylate).

7. The article of claim 6 wherein the copolymer is a copolymer of tetrafluoroethylene and 4-hydroxybutyl vinyl ether.

References Cited
UNITED STATES PATENTS

| | | | |
|---|---|---|---|
| 2,825,664 | 3/1958 | Huntsberger | 260—29.6 XR |
| 2,874,198 | 2/1959 | Barnhart et al. | 260—45.85 XR |
| 3,078,245 | 2/1963 | Heine | 260—29.6 XR |

DONALD E. CZAJA, *Primary Examiner.*

M. J. WELSH, *Assistant Examiner.*